United States Patent
Silva

[11] 3,878,717
[45] Apr. 22, 1975

[54] PRESSURE TO ELECTRICAL ANALOG RATE OF FLOW SIGNAL GENERATOR

[75] Inventor: John R. Silva, Rehoboth, Mass.

[73] Assignee: General Signal Corporation, Rochester, N.Y.

[22] Filed: Nov. 5, 1973

[21] Appl. No.: 413,151

[52] U.S. Cl. ............... 73/205 R; 73/211; 73/407 R
[51] Int. Cl. ...................... G01f 1/00; G01p 5/14
[58] Field of Search... 73/205 R, 205 D, 211, 407 R

[56] References Cited
UNITED STATES PATENTS

| | | | |
|---|---|---|---|
| 2,949,775 | 8/1960 | Newbold | 73/205 |
| 3,040,575 | 6/1972 | Sable | 73/205 |
| 3,181,359 | 5/1964 | Osterstrom | 73/407 |
| 3,293,911 | 12/1966 | Ziegler | 73/205 |

*Primary Examiner*—Herbert Goldstein
*Attorney, Agent, or Firm*—Jeffrey S. Mednick

[57] ABSTRACT

A pressure differential sensing device is provided to deliver an output pressure signal in accordance with a difference between two input pressures. The output pressure signal is applied as a first input to a force balance system for generating an electrical analog output signal. A feedback circuit derives input voltage for a squarer circuit from the analog output signal, and output of the squarer circuit is applied through a scaling circuit to a force motor for converting the feedback signal to a force linearly opposing the first force input to the force balance system.

1 Claim, 1 Drawing Figure

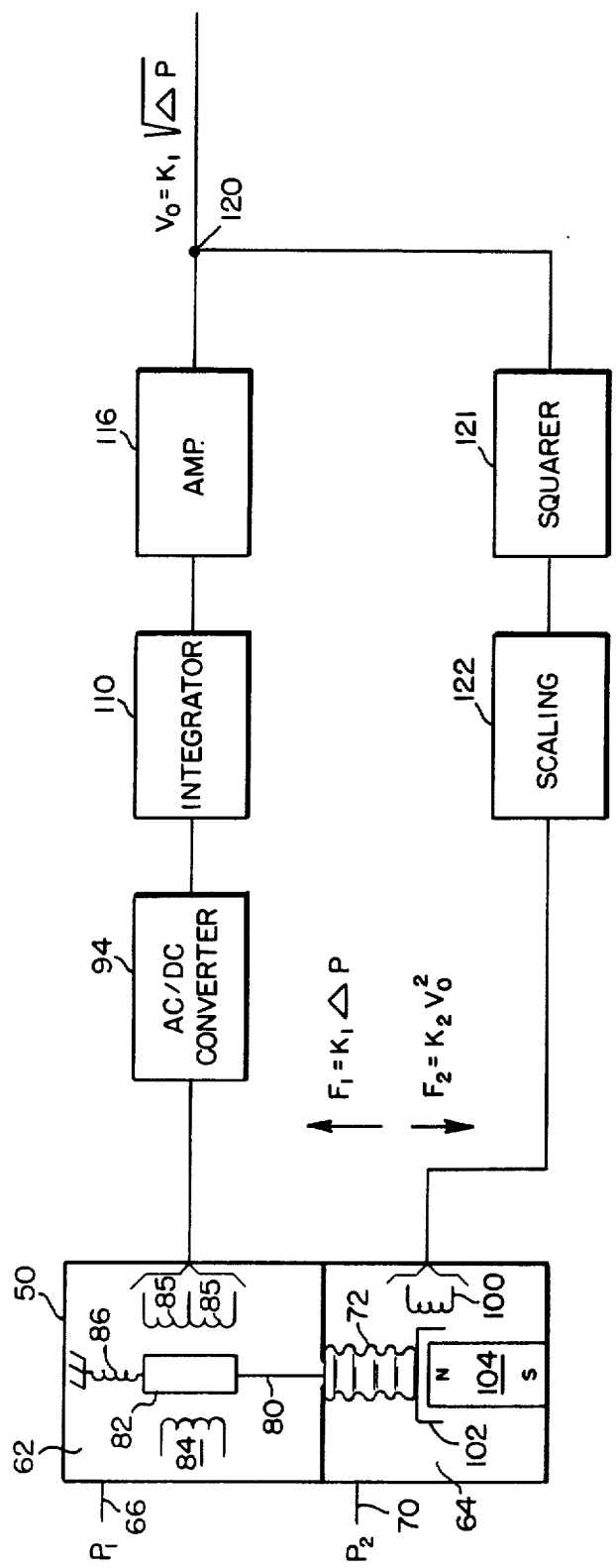

PRESSURE TO ELECTRICAL ANALOG RATE OF FLOW SIGNAL GENERATOR

BACKGROUND OF THE INVENTION

This invention relates to force balance differential pressure to electrical signal generators, and it more particularly pertains to a preferred embodiment of the present invention for extracting the square root of a difference in pressures sensing fluid flow, and generating an electrical analog rate of flow signal in accordance therewith suitable for transmission to electro-responsive apparatus.

There are several types of differential pressure to electrical signal generators, such as of the force balance type, variable capacitance type and variable reluctance type, for example. These signal generators provide analog signals within a desired voltage or current range which vary linearly with an input differential pressure signal. To obtain an output rate of flow signal that varies linearly, it is necessary to extract the square root of the difference in pressure. Electro-mechanical and electro-magnetic systems are known for extracting the square root to obtain the desired linear rate of flow signal. These systems have limitations which affect the accuracy of the generated output signals such as losses in linkages, inaccuracies due to residual magnetism, and the like.

An object of the present invention is to provide a linear rate of flow analog signal generator which substantially obviates one or more of the limitations and disadvantages of the described prior systems.

Other objects, purposes and characteristic features of the present invention will be in part obvious from the accompanying drawing and in part pointed out as the description of the invention progresses.

SUMMARY OF THE INVENTION

A force balance differential pressure to electrical analog rate of flow signal generator is provided by the present invention having fluid pressure differential apparatus for generating a first force proportional to the difference between two input pressures, and a force balance system is provided responsive to changes in the first force for generating an analog output electrical signal. A feedback from the output signal is applied through a squarer circuit and scaling circuits to a force motor in which the feedback signal is converted to a linear force opposing the first force input to the balance system. This feedback configuration provides that the output analog signal is proportional to the square root of the difference between the two input pressures.

In describing the invention in detail, reference will be made to the accompanying drawing.

To simplify the disclosure of the present invention, the disclosure of the Turtle et al application Ser. No. 323,446, filed Jan. 15, 1973 and its associated continuation-in-part application Ser. No. 413,062 filed of even date with the present application and assigned to the same assignee as the present invention, are herein incorporated by reference in the preferred embodiment of the present invention.

The Turtle et al application and the present application disclose high and low pressure fluid inputs $P_2$ and $P_1$ to chambers 64 and 62 respectively in a casing 50. These pressures can be obtained from respective high and low pressure sensor points of a flow sensing device, such as a Venture tube. A difference in pressure between these two inputs is sensed in a dynamic vertical differential balance assembly by a bellows 72, and the difference in pressure is applied as a force input to a force balance apparatus having a differential transformer 84 and a core 82 actuated by a vertical rod 80 coaxial with the chambers and biased by spring 86 and operated by bellows 72. The position of core 82 is sensed by series connected secondary windings 85 in which an alternating current signal is developed, and applied through rectifier 94, integrator 110 and amplifier 116 stages to an output signal wire 120. A feedback from the output signal on wire 120 energizes a coil 100 in casing 50 which attracts a sleeve 102 toward a magnet 104.

A preferred embodiment of the present invention adds to the above structure found in the Turtle et al application a squarer 121 and a scaling circuit 122 in the feedback circuit for generating a force $F_2$ to balance a differential pressure force $F_1$.

In operation, flow is initially sensed by a difference in input pressures $P_1$ and $P_2$ in the pressure chambers 62 and 64 respectively in casing 50 which causes bellows 72 to tend to move upwardly as the difference in pressure increases. This generates a force $F_1$ equal to $K_1 \Delta P$ which is applied as an input to the system dynamic vertical assembly consisting of coil 100 wound on sleeve 102, bellows 72, rod 80, and core 82. This force will cause displacement of the core 82 of differential transformer 84 which obtains an imbalance in center tapped secondary windings 85, which in turn causes an analog output signal $V_0$ to be generated through AC/DC converter 94, integrator 110 and amplifier 116.

The feedback apparatus derives its signal from the output signal $V_0$ at 120 as an input for the squarer 121. The squarer 121 generates an output electrical signal that is the square of its input signal which is applied through scaling circuit 122 which adjusts the range to that desired for input to the force motor winding 100. The force motor is an electro-magnetic device having a force coil 100 within the field of a magnet 104. A force $F_2$ is thus provided as an output of the force motor to oppose the force $F_1$ on the dynamic vertical assembly. The output signal $V_0$ that is developed as a result of a balance between the forces $F_1$ and $F_2$ on the dynamic vertical assembly is equal to $K_1 \sqrt{\Delta P}$. This is true because the force $F_2$ is equal to $K_2 V_0^2$ and, at the balance position of the dynamic vertical assembly the force $F_1$ is equal to the force $F_2$. Therefore $K_1 \Delta P = K_2 V_0^2$ which can be written as $V_0 = K \sqrt{\Delta P}$ It is to be understood that the output signal $V_0$ can be further modified by a driver in accordance with the requirements of practice to provide a standard 1–5 volt DC output signal with substantial current drive capability, or to provide a standard 4–20 milliampere direct current output signal with substantial loop resistance drive capability.

It is to be further understood that the system can be modified to substitute a proportioning circuit for the integrator 110 or to use a proportioning circuit in combination with the integrating circuit 110 as is disclosed in the above mentioned Turtle et al application.

While there is disclosed what at present is considered to be the preferred embodiments of the present invention, it will be obvious to those skilled in the art that changes and modifications may be made therein, without departing from the invention and it is therefore aimed in the appending claims to cover all such changes and modifications as fall within the true spirit and scope of the invention.

What is claimed is:

1. A force balance differential pressure to electrical analog rate of flow signal generator wherein the improvement comprises:
   a. a system dynamic vertical differential pressure balance assembly comprising,
      1 upper and lower coaxial chambers having respective pressure input ports adapted to compare pressure inputs to those ports,
      2 a vertical rod axially operable by sensing an imbalance force characteristic of a difference in pressure in the respective chambers,
      3 a magnetic structure having a balance winding for generating a force when energized opposing the imbalance force,
      4 a differential transformer having a core operated by the rod and effective to deliver an alternating current output signal indicative of the position of the rod,
   b. an AC/DC converter for converting the alternating current output signal into a direct current signal,
   c. an integrator for integrating the direct current signal and providing an integrated signal output,
   d. an amplifier responsive to the integrated signal for delivering an electrical rate of flow signal output,
   e. squaring circuit means responsive to the rate of flow signal for delivering a squared signal output,
   f. scaling means responsive to the squared signal for delivering a scaling signal output varying in proportion to variation of the squared signal, and
   g. circuit means for energizing the winding of the balance assembly in response to the scaling signal.

* * * * *